(12) United States Patent
Tachibana et al.

(10) Patent No.: US 9,557,477 B2
(45) Date of Patent: Jan. 31, 2017

(54) COATED OPTICAL FIBER

(71) Applicant: SUMITOMO ELECTRIC INDUSTRIES, LTD., Osaka-shi, Osaka (JP)

(72) Inventors: Kumiko Tachibana, Yokohama (JP); Takashi Fujii, Yokohama (JP); Takashi Takada, Yokohama (JP); Noriaki Iwaguchi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 859 days.

(21) Appl. No.: 13/923,843

(22) Filed: Jun. 21, 2013

(65) Prior Publication Data
US 2013/0343714 A1  Dec. 26, 2013

(30) Foreign Application Priority Data

Jun. 22, 2012  (JP) .................................. 2012-140926

(51) Int. Cl.
*G02B 6/02* (2006.01)
*C03C 25/10* (2006.01)

(52) U.S. Cl.
CPC ....... *G02B 6/02395* (2013.01); *C03C 25/1055* (2013.01)

(58) Field of Classification Search
None
See application file for complete search history.

(56) References Cited

U.S. PATENT DOCUMENTS

| | | | | |
|---|---|---|---|---|
| 5,054,883 | A * | 10/1991 | Eckberg | C03C 25/105 385/145 |
| 5,181,269 | A * | 1/1993 | Petisce | G02B 6/443 385/126 |
| 5,536,529 | A * | 7/1996 | Shustack | C03C 25/106 427/163.2 |
| 6,559,197 | B2 | 5/2003 | Fewkes et al. | |
| 2003/0045600 | A1 | 3/2003 | Fewkes et al. | |
| 2011/0300367 | A1* | 12/2011 | Chien | C03C 25/1065 428/221 |
| 2013/0064516 | A1* | 3/2013 | Nakanishi | C03C 13/04 385/128 |
| 2014/0376867 | A1* | 12/2014 | Chien | G02B 6/02033 385/123 |

FOREIGN PATENT DOCUMENTS

| | | |
|---|---|---|
| JP | 59-92947 A | 5/1984 |
| JP | 2003-4993 A * | 1/2003 |
| JP | 2003-531799 A | 10/2003 |

* cited by examiner

*Primary Examiner* — Mike Stahl
(74) *Attorney, Agent, or Firm* — Drinker Biddle & Reath LLP

(57) ABSTRACT

A coated glass fiber 1 comprising a glass fiber 10 and one or more coating layers each composed of an ultraviolet curable resin on the outer circumference of the glass fiber 10, wherein the ultraviolet curable resin constituting at least one of the coating layers is formed of an ultraviolet curable coating material containing a silane coupling agent and a photoacid generator. The coated optical fiber 1 coated optical fiber having a high dynamic fatigue coefficient since adhesion between the surface of the glass fiber and the resin coating layer is satisfactory.

7 Claims, 1 Drawing Sheet

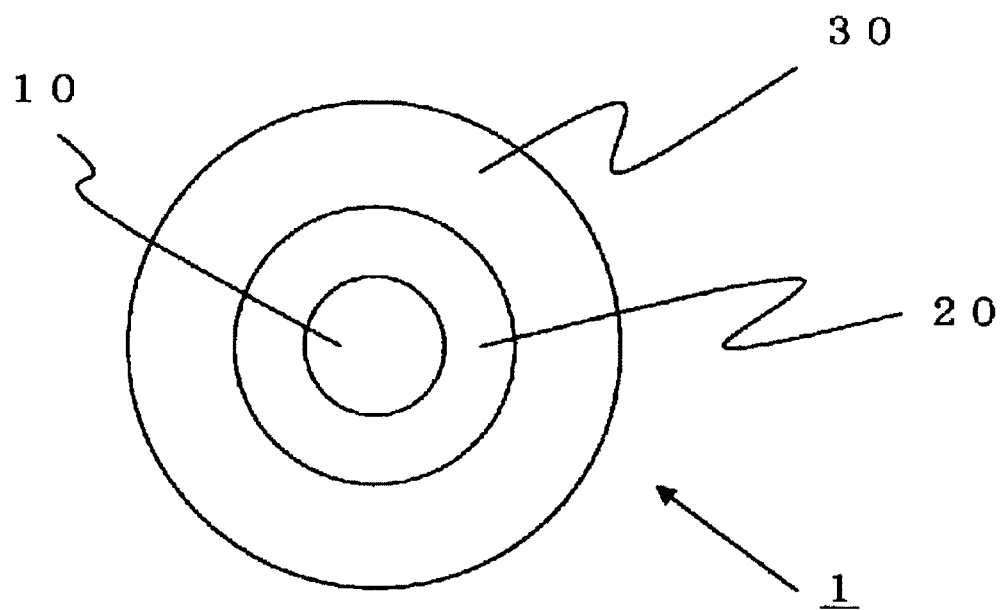

_US 9,557,477 B2_

COATED OPTICAL FIBER

CROSS-REFERENCE TO RELATED APPLICATIONS

This application claims priority from Japanese Patent Application No. 2012-140926, filed on Jun. 22, 2012, the entire contents of which are hereby incorporated by reference.

FIELD OF THE INVENTION

The present invention relates to a coated optical fiber comprising a glass fiber and a resin coating layer provided on the outer circumstance of the glass fiber. More specifically, it relates to a coated optical fiber in which at least one coating layer is formed of an ultraviolet curable coating material having a specific composition.

There has been known a coated optical fiber having a structure that a glass fiber composed of a silica-based glass is coated with a resin layer. The coated optical fiber having such a structure is produced, for example, by the following method. Namely, first, a silica-based glass preform heated and melted in a furnace is pulled out to form a glass fiber. Then, the glass fiber is passed through a coating die containing a resin to apply a curable resin composition on the outer circumference thereof and the resin composition is cured, thereby coating the glass fiber with the coating resin layer. In such a coated optical fiber, interfacial adhesion between the coating resin layer and the glass fiber is required. Accordingly, the adhesion between the glass surface of the glass fiber and the coating resin layer has been improved by adding a silane coupling agent to a resin composition (for example, see JP-A-59-92947).

In order to further improve the adhesion, it is disclosed in JP-T-2003-531799 that a photoacid generator is added into a coating composition, as a catalytic compound for accelerating hydrolysis of a silane coupling agent. From experimental results using the optical fiber as a sample, it was confirmed that, with regard to the coated optical fiber produced by the method, delamination was not observed even when it was immersed in water.

SUMMARY OF INVENTION

An object of the present invention is to provide a coated optical fiber having a good adhesion between the glass fiber and the resin coating layer in the coated optical fiber and having a high dynamic fatigue coefficient.

BRIEF DESCRIPTION OF THE DRAWINGS

FIG. 1 is a schematic cross-sectional view showing one example of the coated optical fiber of the invention.

DETAILED DESCRIPTION OF EXEMPLARY EMBODIMENT

The present inventors have focused on the fact that, for obtaining a sufficient dynamic fatigue coefficient, it is convenient to accelerate the reaction of the added silane coupling agent.

In this regard, the silane coupling agent in the resin composition reacts with a resin through a hydrolysis reaction and a dehydrative condensation reaction, thereby a protective layer on the surface of the glass fiber is formed. However, since these reactions exhibit high reaction rates at acid and basic sides, it is considered to acidify a resin composition to be provided for coating, for improving the adhesion.

However, it is not preferable in view of storage stability.

Accordingly, the inventors of the present invention have devised to acidify the resin composition not at the time of coating with the resin composition but at the time of irradiation with ultraviolet ray in the step of curing the resin composition. Specifically, a photoacid generator is added into the resin composition beforehand and the resin composition is acidified to a pH value of 5 or lower by generating an acid through a reaction of the photoacid generator caused by the ultraviolet irradiation in the resin curing step. Thereby, reactivity of the silane coupling agent is enhanced, and rapid proceeding of the reaction of the silane coupling agent is realized simultaneously to the curing of the resin.

The present invention is accomplished based on the above findings.

Namely, the invention is as follows.

[1] A coated optical fiber comprising a glass fiber and one or more coating layers each composed of an ultraviolet curable resin on the outer circumference of the glass fiber, wherein the ultraviolet curable resin constituting at least one of the coating layers is formed of an ultraviolet curable coating material containing a silane coupling agent and a photoacid generator.

[2] The coated optical fiber according to [1], wherein pH of the coating layer is 5 or lower.

[3] The coated optical fiber according to [1] or [2], wherein the content of the photoacid generator in the ultraviolet curable coating material is from 0.25 to 3% by weight.

[4] The coated optical fiber according to any one of [1] to [3], wherein pullout force for pulling out the glass fiber from the coating layer is 0.5 kg or more and 1.5 kg or less.

[5] The coated optical fiber according to any one of [1] to [4], wherein an increase in transmission loss when it is placed at −40° C. for 2 hours is 0.03 dB/km or less.

[6] The coated optical fiber according to any one of [1] to [4], wherein the content of the photoacid generator in the ultraviolet curable coating material is from 0.25 to 2.5% by weight.

[7] The coated optical fiber according to any one of [1] to [4], wherein the content of the photoacid generator in the ultraviolet curable coating material is from 0.25 to 2.5% by weight and an increase in transmission loss when the fiber is placed at −40° C. for 2 hours is 0.03 dB/km or less.

[8] The coated optical fiber according to any one of [1] to [7], wherein the coating layer includes an inner layer coming into contact with the glass fiber and an outer layer on the outer circumference thereof and the inner layer is formed of the ultraviolet curable coating material.

According to the invention, since adhesion between the surface of the glass fiber and the resin coating layer is satisfactory, it is possible to provide a coated optical fiber having a high dynamic fatigue coefficient.

The following will describe the coated optical fiber of one embodiment of the invention in detail with reference to FIG. 1.

FIG. 1 is a schematic cross-sectional view showing one example of the coated optical fiber of the embodiment.

A coated optical fiber 1 has an inner layer 20 obtained by curing a curable resin on the outer circumference of a glass fiber 10 and an outer layer 30 obtained by curing a curable resin on the outer circumference thereof. A resin coating layer is formed of two layers of the inner layer 20 and the outer layer 30. The layer structure of the resin coating layer is not limited to the two-layer structure shown in FIG. 1 and may be a multilayer structure further having a third coating layer and a fourth coating layer or may be a single layer structure composed of the inner layer 20 alone.

The glass fiber 10 usually has a cladding layer composed of silica glass on the outer circumference of a core layer composed of a silica-based glass. The outer diameter of the core layer may be, for example, from 7 μm to 60 μm and the outer diameter of the cladding layer may be, for example, 125 μm.

The inner layer 20 is a layer of a cured resin formed on the outer circumference of the glass fiber 10 so as to come into contact with the glass fiber 10 and the thickness thereof may be, for example, from 10 μm to 50 μm. Moreover, as shown in FIG. 1, in the case where the outer layer 30 is present, the outer layer 30 is also a layer of a cured resin and the thickness thereof may be, for example, from 10 μm to 50 μm. By providing such a layer, it becomes easy to protect the glass fiber from impact from the outside. From the viewpoint of protection from impact, the Young's modulus of the outer layer 30 is more preferably larger than the Young's modulus of the inner layer 20.

The layers of cured resins constituting the inner layer 20 and the outer layer 30 are preferably formed by curing an ultraviolet curable coating material. However, at least one of the coating layers formed on the outer circumference of the glass fiber 10, preferably at least the inner layer 20 that comes into contact with the glass fiber 10 is formed of an ultraviolet curable coating material containing a silane coupling agent and a photoacid generator. In addition, with regard to the ultraviolet curable coating material, the pH value thereof becomes 5 or lower after ultraviolet irradiation.

The content of the silane coupling agent in the ultraviolet curable coating material is preferably from 1 to 10% by weight. By controlling the content to this range, the adhesion between the surface of the glass fiber and the resin coating layer can be made satisfactory.

As the silane coupling agent, any ones including known and publicly used ones can be used without particular limitation as long as they do not inhibit the effects of the embodiment. Specifically, there may be mentioned tetramethyl silicate, tetraethyl silicate, mercaptopropyltrimethoxysilane, oligomer-added mercaptopropyltrimethoxysilane (silane coupling agent obtained by reacting an SH part of mercaptopropyltrimethoxysilane with NCO of an oligomer), vinyltrichlorosilane, vinyltriethoxysilane, vinyltris(β-methoxy-ethoxy)silane, β-(3,4-epoxycyclohexyl)-ethyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, γ-trimethoxysilylpropylbenzothiazyl tetrasulfide, and the like.

The content of the photoacid generator in the ultraviolet curable coating material is preferably from 0.25 to 3% by weight. When the content is 0.25% by weight or more, the pH value after the ultraviolet irradiation becomes surely 5 or lower and thus the case is preferable. On the other hand, when the photoacid generator is contained in an amount of 3% by weight, it is considered that the silane coupling agent is all reacted after the ultraviolet irradiation, so that further improvement in the dynamic fatigue coefficient is not observed even when the agent is added in an amount of more than 3% by weight and thus it is not profitable to add it in an amount of more than 3% by weight.

The content of the photoacid generator in the ultraviolet curable coating material is more preferably from 0.25 to 2.5% by weight. When the photoacid generator is contained in an amount of more than 2.5% by weight, an increase in transmission loss when the coated optical fiber is placed at −40° C. becomes remarkable and there is a case where it becomes unsuitable to use the fiber in an extremely low temperature environment.

As the photoacid generator, a diazosulfone-based photoacid generator, a triarylsulfonium-based photoacid generator, and the like can be suitably used.

The ultraviolet curable coating material can contain (A) a (meth)acryloyl group-containing urethane oligomer obtained by reacting at least an aliphatic polyether-based polyol, an organic polyisocyanate, a hydroxyl group-containing (meth)acrylate, and the like, other than the above silane coupling agent and photoacid generator. In addition, it is preferable to contain (B) a reactive diluent and (C) a photo radical initiator.

The (A) (meth)acryloyl group-containing urethane oligomer obtained by reacting at least an aliphatic polyether-based polyol, an organic polyisocyanate, a hydroxyl group-containing (meth)acrylate, and the like (hereinafter also referred to as "(A) (meth)acryloyl group-containing urethane oligomer") is a reactive oligomer having a reactive group. The molecular weight is preferably from about 5,000 to 30,000. The curing of the resin is performed by polymerizing the (A) (meth)acryloyl group-containing urethane oligomers themselves or polymerizing it with the (B) reactive diluent that is a reactive monomer. The (A) (meth)acryloyl group-containing urethane oligomer is preferably contained in an amount of 60 to 80% by weight in the ultraviolet curable coating material. When it is contained such a ratio, the curability is assured and it becomes easy to obtain a good hardness of the coating layer.

Examples of the aliphatic polyether-based polyol include polyethylene glycol, polypropylene glycol, polytetramethylene glycol, polyhexamethylene glycol, polyheptamethylene glycol, polydecamethylene glycol, and polyether diols obtained by ring-opening copolymerization of two or more ionically polymerizable cyclic compounds.

Examples of the ionically polymerizable cyclic compounds include cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcylcohexene oxide, phenyl glycidyl ether, butyl glycidyl ether, and benzoic acid glycidyl ester.

Specific examples of the polyether diols obtained by ring-opening copolymerization of two or more ionically polymerizable cyclic compounds include binary copolymers obtained from combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, and the like; and a ternary copolymer obtained from a combination of tetrahydrofuran, butene-1-oxide and ethylene oxide.

These aliphatic polyether-based polyols may be used singly or two or more thereof may be used in combination.

As the organic polyisocyanate, an aromatic diisocyanate, an alicyclic diisocyanate, an aliphatic diisocyanate, and the like may be mentioned.

Examples of the aromatic diisocyanate include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, bis(2-isocyanatoethyl)fumarate, 6-isopropyl-1,3-phenylene diisocyanate, 4-diphenylpropane diisocyanate, and tetramethylxylylene diisocyanate.

Example of the alicyclic diisocyanate include isophorone diisocyanate, methylenebis(4-cyclohenyl isocyanate), hydrogenated diphenylmethane diisocyanate, hydrogenated xylylene diisocyanate, 2,5-bis(isocyanatomethyl)-bicyclo[2.2.1]heptane, and 2,6-bis(isocyanatomethyl)-bicyclo[2.2.1]heptane.

Examples of the aliphatic diisocyanate include 1,6-hexane diisocyanate, 2,2,4-trimethylhexamethylene diisocyanate, and lysine diisocyanate.

Of these, in view of economical efficiency and in view of obtaining compositions of stable quality, aromatic diisocyanates are more preferred and 2,4-tolylene diisocyanate and 2,6-tolylene diisocyanate are particularly preferred. These organic polyisocyanates may be used singly or two or more thereof may be used in combination.

As the hydroxyl group-containing (meth)acrylate, it is preferred to use a hydroxyl group-containing (meth)acrylate in which the hydroxyl group is bonded to a primary carbon atom (hereinafter also referred to as a "primary hydroxyl group-containing (meth)acrylate") and a hydroxyl group-containing (meth)acrylate in which the hydroxyl group is bonded to a secondary carbon atom (hereinafter also referred to as a "secondary hydroxyl group-containing (meth)acrylate"). A hydroxyl group-containing (meth)acrylate in which the hydroxyl group is bonded to a tertiary carbon atom (hereinafter also referred to as a "tertiary hydroxyl group-containing (meth)acrylate") is not preferred since it is inferior in reactivity with an isocyanate group.

Examples of the primary hydroxyl group-containing (meth)acrylate include 2-hydroxyethyl (meth)acrylate, 3-hydroxypropyl (meth)acrylate, 4-hydroxybutyl (meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, and trimethylolethane di(meth)acrylate.

Examples of the secondary hydroxyl group-containing (meth)acrylate include 2-hydroxypropyl (meth)acrylate, 2-hydroxybutyl (meth)acrylate, 2-hydroxy-3-phenyloxypropyl (meth)acrylate, and 4-hydroxycyclohexyl (meth)acrylate. In addition, compounds obtained by the addition reaction of glycidyl group-containing compounds such as an alkyl glycidyl ether, an allyl glycidyl ether, and a glycidyl (meth)acrylate with (meth)acrylic acid are also mentioned.

In addition to the above aliphatic polyether-based polyol, organic polyisocyanate, and the hydroxyl group-containing (meth)acrylate, a monohydric alcohol may be further reacted. The monohydric alcohol includes methanol, ethanol, n-propanol, propanol, n-butanol, i-butanol, t-butanol and the like, and methanol or ethanol is preferred.

The (B) reactive diluent is a reactive monomer and is preferably contained in an amount of 20 to 40% by weight in the ultraviolet curable coating material.

The (B) reactive diluent is not particularly limited but a compound having one ethylenic unsaturated group and a compound having two or more ethylenic unsaturated groups are mentioned.

Specific examples of the compound having one ethylenic unsaturated group include vinyl group-containing lactams such as N-vinylpyrrolidone and N-vinylcaprolactam, alicyclic structure-containing (meth)acrylates such as isobornyl (meth)acrylate, bornyl (meth)acrylate, tricyclodecanyl (meth)acrylate, dicyclopentanyl (meth)acrylate, dicyclopentenyl (meth)acrylate, and cyclohexyl (meth)acrylate, benzyl (meth)acrylate, 4-butylcyclohexyl (meth)acrylate, acryloylmorpholine, vinylimidazole, and vinylpyridine. Furthermore, 2-hydroxyethyl (meth)acrylate, 2-hydroxypropyl (meth)acrylate, 4-hydroxybutyl (meth)acrylate, stearyl (meth)acrylate, isostearyl (meth)acrylate, tetrahydrofurfuryl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone(meth)acrylamide, isobutoxymethyl(meth)acrylamide, N,N-dimethyl(meth)acrylamide, t-octyl(meth)acrylamide, dimethylaminoethyl (meth)acrylate, diethylaminoethyl (meth)acrylate, 7-amino-3,7-dimethyloctyl (meth)acrylate, N,N-diethyl(meth)acrylamide, N,N-dimethylaminopropyl (meth)acrylamide, hydroxybutyl vinyl ether, lauryl vinyl ether, cetyl vinyl ether, 2-ethylhexyl vinyl ether, vinyloxyethoxyethyl (meth)acrylate, and vinyloxyethyl (meth)acrylate.

Specific examples of the compound having two or more ethylenic unsaturated groups include trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl)isocyanurate di(meth)acrylate, tricyclodecanedimethanol di(meth)acrylate, a di(meth)acrylate of a diol of an ethylene oxide or propylene oxide adduct of bisphenol A, a di(meth)acrylate of a diol of an ethylene oxide or propylene oxide adduct of hydrogenated bisphenol A, an epoxy (meth)acrylate in which a (meth)acrylate is added to glycidyl ether of bisphenol A, and triethylene glycol divinyl ether.

The (C) photo radical initiator is preferably contained in an amount of 0.1 to 5% by weight in the ultraviolet curable coating material.

The (C) photo radical initiator is not particularly limited but examples thereof include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, and bis-(2,6-dimethoxybenzoyl)-2,4,4-trimethylpentylphosphine oxide.

At the time when a coating material added with a photoacid generator is applied on a glass fiber as in the embodiment, it is effective to keep the viscosity of the coating material from increasing at its application by acidifying the coating material after it is applied on the glass fiber while the coating material is not acidified at the application.

EXAMPLES

The following will describe the present invention in further detail with showing results of evaluation tests using Examples according to the invention and Comparative Examples. The invention should not be construed as being limited to these Examples.

[Production of Ultraviolet Curable Coating Material]

Ultraviolet curable coating materials each containing ingredients shown below in the composition were prepared.

| Silane coupling agent | amount described in Table 1 below |
| Photoacid generator | amount described in Table 1 below |
| Urethane oligomer | 70 parts by weight |
| Reactive diluent | 30 parts by weight |
| Photo radical initiator | 1 part by weight |

In the above composition, tetramethyl silicate was used as the silane coupling agent and a diazosulfone-based photoacid generator was used as the photoacid generator.

[Preparation of Coated Optical Fiber]

Each of coated optical fibers (Examples 1 to 5, Comparative Example 1) was prepared by forming an inner layer with each of the above ultraviolet curable coating materials on the outer circumference of a glass fiber having a cladding layer composed of silica glass provided on the outer circumference of a core layer composed of a silica-based glass and further forming an outer layer with a urethane acrylate-based ultraviolet curable resin composition on the outer circumference thereof.

For the above prepared coated optical fibers, pH of the resin coating layer, dynamic fatigue coefficient, pullout force, and an increase in attenuation coefficient at low temperature were measured by the following methods. Table 1 shows the results.

[Measurement of pH]

Two grams of the coated optical fiber was immersed in pure water to which a 0.01N aqueous sodium hydroxide solution or 0.01N HCl had been added so as to be pH=7.0, and pH after 80° C.×24 h extraction from the coating layer was measured by means of a pH meter.

[Measurement of Dynamic Fatigue Coefficient]

Using a tensile tester, n values were measured and evaluated in accordance with the description of Teccordia GR-20-CORE, and the case where the n value is 20 or more was evaluated as passed.

[Evaluation Method of Pullout Force]

The resin coating layer of the coated optical fiber was nicked with a razor in such a depth that the blade edge did not reach the glass surface, one resin coating layer across the nick was attached to a mount and the mount was fixed, and another coated optical fiber was gripped and pulled. The pullout force at the time when the optical fiber (glass part) was pulled out from the resin coating layer fixed to the mount was measured. The case where the force is less than 0.5 kg is evaluated as bad and the case where it is from 0.5 to 1.5 kg is evaluated as good, which are shown in Table 1.

[Measurement Method for Increase in Low-Temperature]

The transmission loss for the coated optical fiber was measured and, after the coated optical fiber was placed at −40° C. for 2 hours, the transmission loss of a light having a wavelength of 1,550 nm was measured. In comparison with that before placed at −40° C., an increase in transmission loss after placed at −40° C. was determined. The case where the increase in the transmission loss is 0.03 dB/km or less is evaluated as "good" and the case where it exceeds 0.03 dB/km is evaluated as "bad", which are shown in Table 1.

TABLE 1

|  | Example 1 | Example 2 | Example 3 | Example 4 | Example 5 | Comparative Example 1 |
| --- | --- | --- | --- | --- | --- | --- |
| Silane coupling agent (% by weight) | 1 | 1 | 1 | 10 | 10 | 5 |
| Photoacid generator (% by weight) | 0.25 | 0.5 | 2.5 | 3 | 5 | 0 |
| pH | 5 | 5 | 4.5 | 4.2 | 4 | 6 |
| Dynamic fatigue coefficient | 21 | 23 | 23 | 27 | 27 | 18 |
| Pullout force | good | good | good | good | bad | good |
| Increase in low-temperature loss | good | good | good | bad | bad | good |

From the above results, it is observed that the dynamic fatigue coefficient is good in the coated optical fibers using the ultraviolet curable coating material in which pH of the resin coating layer is controlled to 5 or lower by adding the photoacid generator (Examples) as compared with the coated optical fiber using the ultraviolet curable coating material in which no photoacid generator is added (Comparative Example). In the ultraviolet curable coating material to which the photoacid generator is added in an amount of 3% by weight (Example 4) and the ultraviolet curable coating material to which the photoacid generator is added in an amount of 5% by weight (Example 5), the dynamic fatigue coefficients of the produced coated optical fibers are equal, and therefore it is confirmed that the effect is not enhanced even when the photoacid generator is added in an amount of 3% by weight or more. In view of the pullout force, it is preferable that the amount of the photoacid generator to be added does not exceed 3% by weight. In addition, in view of little increase in loss at low temperature (−40° C.), it is preferable that the amount of the photoacid generator to be added does not exceed 2.5% by weight.

What is claimed is:

1. A coated optical fiber comprising a glass fiber and one or more coating layers each composed of a cured ultraviolet curable resin on the outer circumference of the glass fiber,
   wherein the ultraviolet curable resin from which at least one of the coating layers is formed comprises an ultraviolet curable coating material containing a silane coupling agent and a photoacid generator
   wherein pH of each of the one or more coating layers is 5 or lower.

2. The coated optical fiber according to claim 1, wherein the content of the photoacid generator in the ultraviolet curable coating material is from 0.25 to 3% by weight.

3. The coated optical fiber according to claim 1, wherein pullout force for pulling out the glass fiber each of the one or more coating layers is 0.5 kg or more and 1.5 kg or less.

4. The coated optical fiber according to claim 1, wherein an increase in transmission loss when it is placed at −40° C. for 2 hours is 0.03 dB/km or less.

5. The coated optical fiber according to claim 1, wherein the content of the photoacid generator in the ultraviolet curable coating material is from 0.25 to 2.5% by weight.

6. The coated optical fiber according to claim 1, wherein the content of the photoacid generator in the ultraviolet curable coating material is from 0.25 to 2.5% by weight and an increase in transmission loss when the fiber is placed at −40° C. for 2 hours is 0.03 dB/km or less.

7. The coated optical fiber according to claim 1, wherein the coating layer includes an inner layer coming into contact with the glass fiber and an outer layer on the outer circumference thereof and the inner layer is formed of the ultraviolet curable coating material.

* * * * *